No. 782,639. PATENTED FEB. 14, 1905.
S. R. BAILEY.
INTERLOCKING ANGLE JOINT.
APPLICATION FILED MAR. 28, 1904.
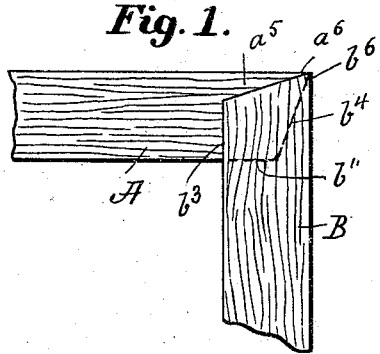
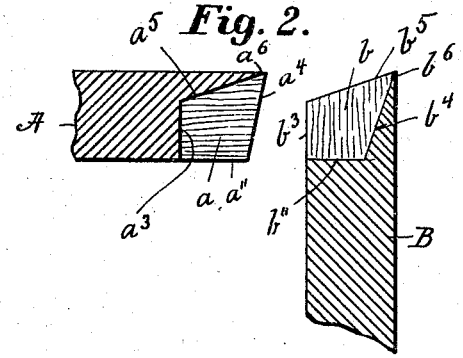
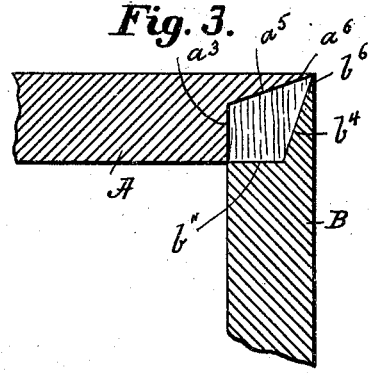
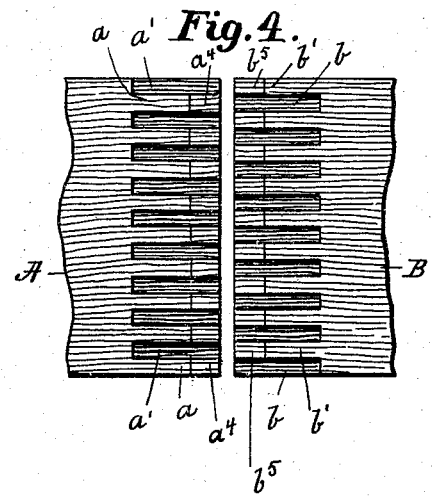
Witnesses:
Nathan C. Lombard 2nd
Edwin T Luce
Inventor:
Samuel R. Bailey.
by Alban Andrew
Atty.

No. 782,639. Patented February 14, 1905.

UNITED STATES PATENT OFFICE.

SAMUEL R. BAILEY, OF AMESBURY, MASSACHUSETTS.

INTERLOCKING ANGLE-JOINT.

SPECIFICATION forming part of Letters Patent No. 782,639, dated February 14, 1905.

Application filed March 28, 1904. Serial No. 200,294.

*To all whom it may concern:*

Be it known that I, SAMUEL R. BAILEY, a citizen of the United States, and a resident of Amesbury, in the county of Essex and State of Massachusetts, have invented certain new and useful Improvements in Interlocking Angle-Joints, of which the following is a specification.

This invention relates to improvements in making interlocking angle-joints at the junction of wooden plates for the purpose of rendering the joint of the greatest strength possible without additional stays or braces and also for the purpose of making what is termed a "blind" or "concealed" joint at the corner, in which the interlocking tongues are not visible.

This my improved joint is especially useful on carriage-bodies or the like, in which it is desirable to secure the corner portions of the plates together as strongly and firmly as possible and at the same time to produce a blind or concealed joint at the corner of the intersecting surfaces. Although especially advantageous on carriage-bodies, &c., it is equally useful for other purposes where wooden plates are to be secured together at a right angle or more or less acute or obtuse, as may be desired.

The invention is carried out as follows, reference being had to the accompanying drawings, wherein—

Figure 1 is an end elevation of two plates joined together at the angle thereof in accordance with my construction. Fig. 2 is a sectional view of the two wooden plates before being secured together. Fig. 3 is a similar sectional view showing the said plates interlocked and secured together. Fig. 4 is a bottom plan view of the interior portion of the plates before being secured together.

Similar letters refer to similar parts wherever they occur on the different parts of the drawings.

A and B represent a pair of wooden plates to be joined together at an angle relative to each other, as shown in Figs. 1 and 3. At the jointed end the plate A is provided with tongues $a\,a$ and intermediate grooves $a'\,a'$, as shown. In a similar manner the jointed end of the plate B is provided with grooves $b\,b$ and intermediate tongues $b'\,b'$, said tongues and grooves in one plate adapted to interlock with the grooves and tongues in the other plate when joined together. The inner edge $a''$ of each tongue $a$ is made substantially parallel with the inside of the plate A and adapted to fit against and contact a square shoulder $b''$ in the bottom of the groove $b$ in the other plate, as shown. In a similar manner the inner edge $b^3$ of each tongue $b$ is made substantially parallel with the inside of the plate B and adapted to fit against and contact a square shoulder $a^3$ in the groove $a'$ in the opposite plate, as shown.

The end $a^4$ of each tongue $a$ on the plate A is inclined and adapted to fit against and contact the under side of a corresponding wedge-shaped portion $b^4$ at the bottom of the groove $b$ on the plate B, and in a similar manner the end $b^5$ of each tongue $b'$ on the plate B is inclined and adapted to fit against and contact the inside of a corresponding wedge-shaped portion $a^5$ at the bottom of the groove $a'$ on the plate A when the plates are assembled as shown in Figs. 1 and 3. The wedge portions $a^4$ and $b^4$ terminate, preferably, as respective feather or knife edges $a^6 b^6$, as shown in Figs. 1, 2, and 3, by which construction the joint at the corner between the interlocking tongues and grooves is concealed.

The interlocking parts on the plates when assembled are united by glue or other equivalent adhesive material.

It will be noticed that the ends of the overlapping projections $a^5 b^4$ serve to cover and conceal the grooves in the respective plates when the latter are assembled, as shown.

What I wish to secure by Letters Patent and claim is—

1. The herein-described interlocking angle-joint, including a pair of sections having interlocking tongues and grooves, the tongues of each section being of uniform width with the sections, and provided with inclined ends and each of said grooves correspondingly shaped to the tongues to interlock and contact, substantially as described.

2. The herein-described interlocking angle-joint consisting of a pair of plates having respective interlocking tongues and grooves, each of said tongues having their inner edge in parallelism with the inner face of the plate, and provided with a slightly-inclined end, and each of said grooves correspondingly shaped to the tongues, substantially as described.

In testimony whereof I have affixed my signature in presence of two witnesses.

SAMUEL R. BAILEY.

Witnesses:
 ALBAN ANDRÉN,
 ALVAH C. STONE.